United States Patent

[11] 3,601,124

| [72] | Inventor | Frank L. Petree<br>387 Westmoreland, Idaho Falls, Idaho 83401 |
|---|---|---|
| [21] | Appl. No. | 756,202 |
| [22] | Filed | Aug. 29, 1968 |
| [45] | Patented | Aug. 24, 1971 |

[54] FLUID FLOW REGULATOR
8 Claims, 5 Drawing Figs.

[52] U.S. Cl. .................................................... 128/214,
137/486, 137/487.5, 222/63
[51] Int. Cl. .................................................... A61m 5/00
[50] Field of Search........................................... 178/213,
214, 214.2, DIG. 13; 137/486, 487.5, 101.19;
222/14, 52, 63, 76, 59

[56] References Cited
UNITED STATES PATENTS

| 3,163,176 | 12/1964 | Darling......................... | 137/487.5 |
| 3,252,623 | 5/1966 | Corbin .......................... | 222/59 |
| 3,450,153 | 6/1969 | Hildebrandt et al. ......... | 137/486 |

FOREIGN PATENTS

| 667,878 | 8/1965 | Belgium ....................... | 128/214 |

*Primary Examiner*—Dalton L. Truluck
*Attorney*—Delio and Montgomery

ABSTRACT: An intravenous fluid flow regulator wherein a clamp is motor operated to either constrict or open a tube in response to a rate reference signal and a fluid drop signal. A tube clamp is moved toward an unclamped position and a rate responsive to the rate reference signal and then is moved toward a clamping position in response to a fluid drop system.

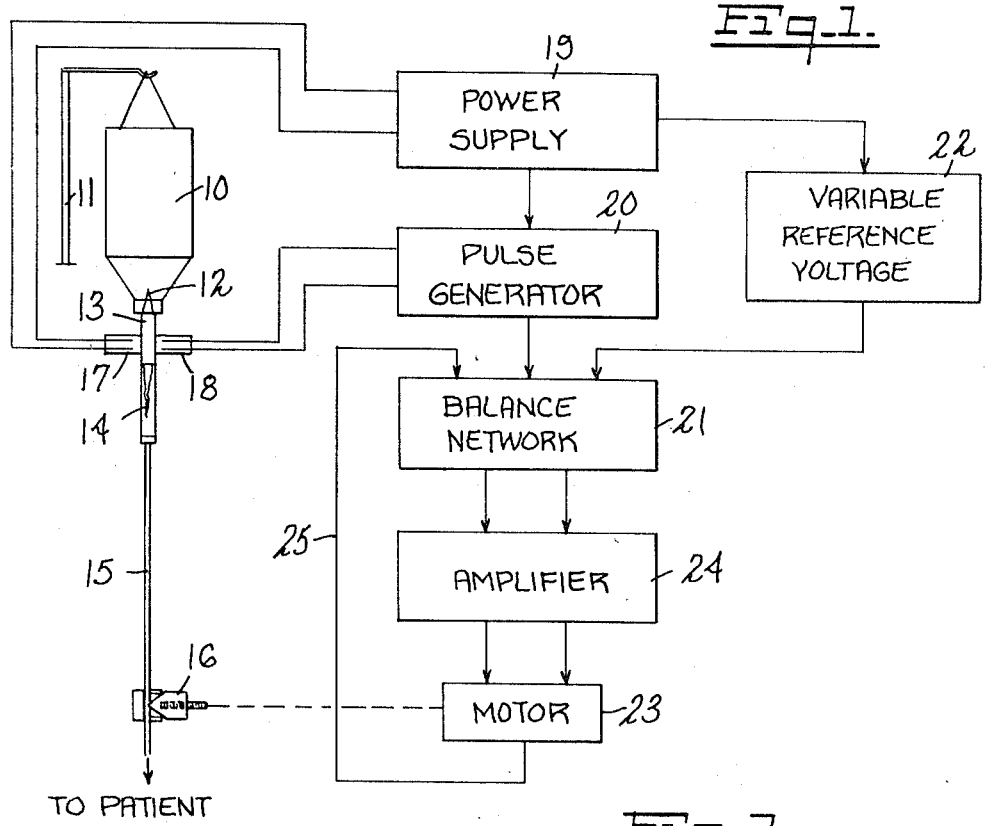
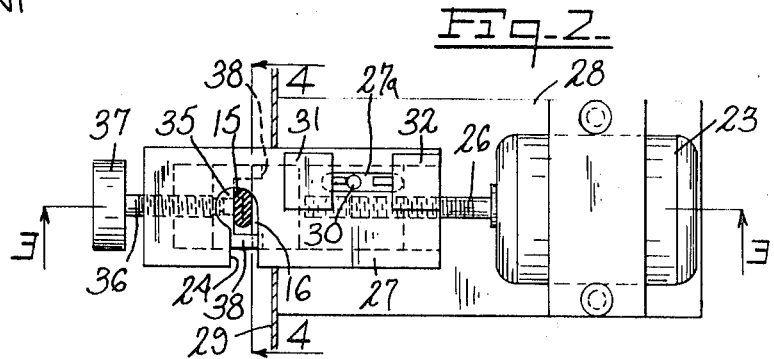
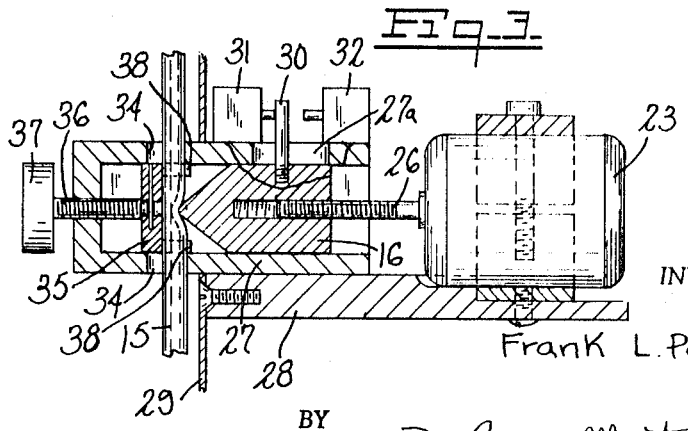

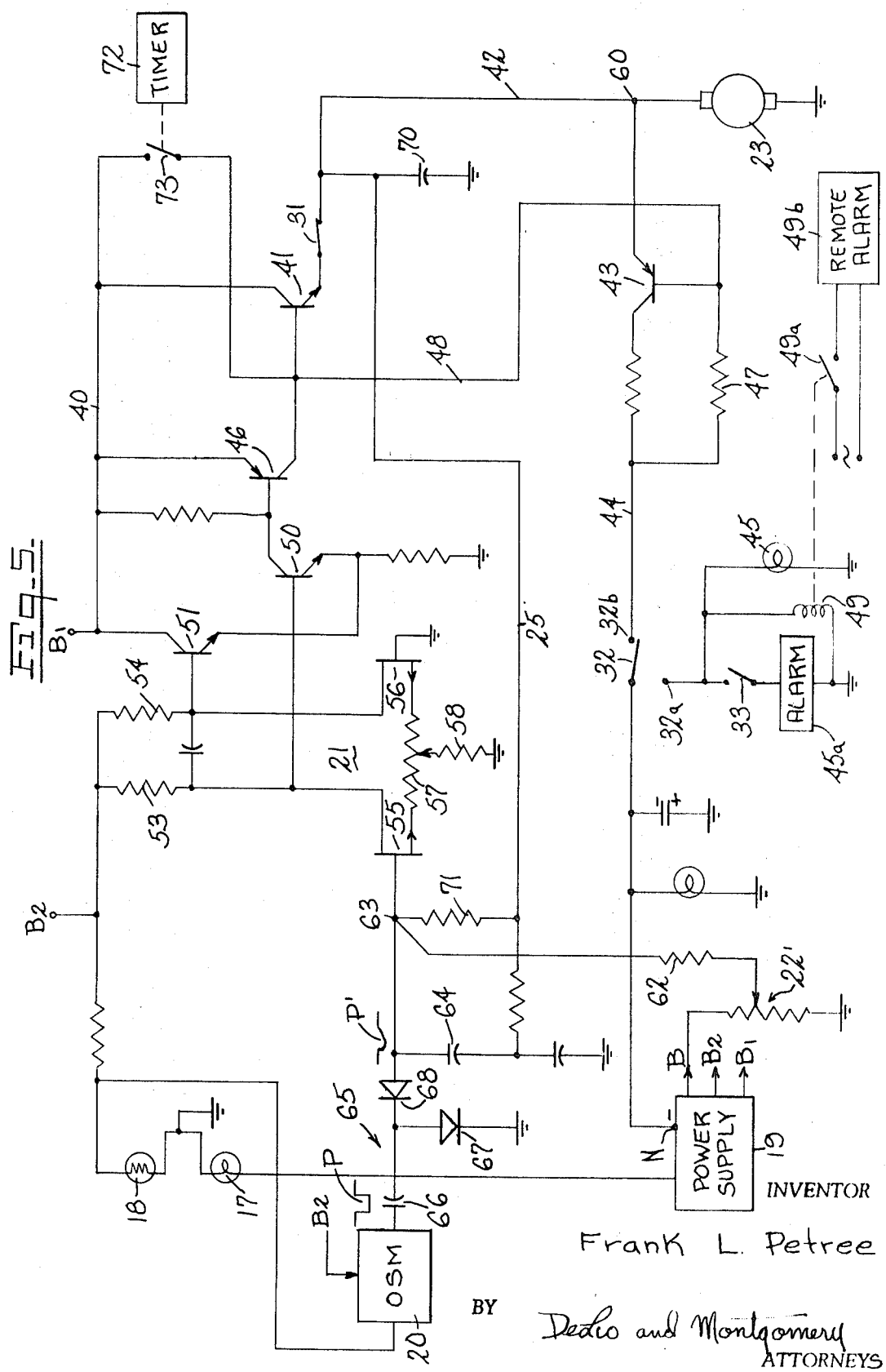

FLUID FLOW REGULATOR

This invention relates to a system for regulating fluid flow, and more particularly relates to regulating fluid flow in the form of discrete drops.

The invention may be embodied in medical systems for controlling the rate of application of fluid in blood transfusions, intravenous feeding and other applications where it is important to control and/or monitor a predetermined rate of application of fluid to a patient.

For many years the standard technique for controlling intravenous flow has been constricting the tubing which provides fluids directly to the patient, and it has also been universally required that a doctor or nurse check the flow rate to make sure that it is proper. Changes in condition or position of the patient as well as ambient atmospheric conditions may cause the drop rate to very from a predetermined rate. Additionally, should there not be a doctor or nurse in attendance upon exhaustion of the fluid supply being applied to the patient, the patient may go without needed fluid.

Automatic systems have been proposed which comprise a DC reference voltage which may be set to establish a predetermined drop rate which is compared with an integrated train of pulses, each indicative of a sensed drop, and the integrated signal and the reference signal compared to derive a voltage error signal which actuates a motor-operated lever system to pinch and release the tube. This proposed system, however, suffers from a serious disadvantage in that the use of the integrator introduces nonlinearities into the system and, therefore, the operation is nonlinear with respect to the reference voltage. Additionally, the operation of the motor in restricting the tube is in response to a voltage error signal and is not positively operated to both restrict and open the feed tube.

Accordingly, the present invention provides a new and improved means for automatically controlling the drop rate of a fluid over a wide range of selectable drop rates. The present invention accomplishes this through the use of a constriction on a feed tube which is actuated by a linearly movable wedge or clamp that is positively driven both to constrict and to open the tube.

The invention further provides a new and improved clamping device for the feed tube and actuation therefor and a new and improved amplifying arrangement producing actuation of the clamping motor in two directions.

The invention further provides a new and improved electronic network for detecting any unbalance in a bridge circuit due to detection of a drop and further responsive to a reference voltage in opposed senses to produce continuous energization of the clamp drive motor.

Accordingly, an object of this invention is to provide a new and improved fluid flow regulator of the type described.

Another object of this invention is to provide a fluid flow regulator of the type described having new and improved means for insuring linearity between the actual drop rate and the indicia setting such drop rate.

Another object of this invention is to provide a new and improved motor-operated mechanism for constricting and releasing a feed tube in a device of the type described.

A further object of this invention is to provide new and improved circuit means which continually operate a feed tube constricting motor in response to a reference drop rate and the actual detected drop rate.

The features of the invention which are believed to be novel are distinctly set forth and particularly claimed in the concluding portion of this specification. The invention, however, both as to its operation and organization, together with further objects and advantages thereof, may best be appreciated by reference to the following detailed description taken in conjunction with the drawings, wherein:

FIG. 1 is a block diagram exemplifying the organization of an embodiment of the invention;

FIG. 2 illustrates the apparatus for controlling constriction of the feed tube;

FIG. 3 is a view seen in the plane of lines 3—3 of FIG. 2;

FIG. 4 is a view seen in the plane of lines 4—4 of FIG. 2; and

FIG. 5 is a diagram, predominantly schematic, and partly in block form exemplifying the circuitry in which the invention may be embodied.

A bottle 10 which may contain a fluid to be injected or transfused into a patient is supported in an inverted position from a stand 11 which may be either free standing or clamped to a hospital bed. The bottle is supported from the stand 11 by means of a conventional holding arrangement. The needle point 12 of a drop chamber is inserted into bottle 10 to provide communication to the lower portion of the drop chamber 13. The drop chamber 13 may include a filter 14 as a precautionary measure.

The drop chamber 13 serves as a visual metering device to enable an attendant to check the drop rate of fluid from bottle 10 into chamber 13. Fluid leaves drop chamber 13 by a flexible tube 15 which is provided at the free end thereof with a needle (not shown) for penetrating into the vein of the patient to be provided with the fluid. As will be more fully explained hereinafter, a clamping device 16 is operative to restrict passage of fluid through tube 15 and control the rate at which the fluid is administered to the patient A mechanical flow-restricting clamp (not shown) is conventionally placed on the tube 15 between the patient and clamp 16 adjusted to allow the flow of fluid in discrete drops at a faster rate than the regulated valve, but to prevent streaming of fluid to the patient.

To meter the passage of fluid drops from bottle 10 to tube 15 a sensing arrangement is provided which may comprise a light source 17 and a photosensitive element 18. A drop of fluid passing through chamber 13 interrupts the light incident on element 18 from source 17. The photosensitive elements are supplied by electric power from a power supply 19. The interruption of light produced by the passage of a drop through chamber 13 is utilized to trigger a pulse generator 20 which is preferably in the form of a one-shot multivibrator, as hereinafter made apparent. The output of the pulse generator 20 is applied to a balance network 21, hereinafter more fully explained, together with a reference voltage from a reference voltage source 22. The reference voltage input to the balance network 21 is selected to have a value which is directly proportional to the rate at which drops are allowed to fall through drop chamber 13.

The fluid will drip from bottle 10 into chamber 13 so long as the pressure therein does not inhibit such dripping. For example, if the clamping member 16 permanently constricts tube 15 a certain number of drops would fall into chamber 13 and accumulate in tube 15 until the air pressure in chamber 13 built up to a value which inhibited a further dripping from bottle 10. The clamping member 16 is driven in a linear path by motor 23. As will hereinafter be more fully explained, the reference voltage acts to drive the motor in a direction which removes constriction of tube 15 while an unbalance of network 21 caused by detection of a drop through chamber 13 acts to drive motor 23 in the opposite direction. The output of the balance network determines the direction of operation of motor 23 and such output is applied to an amplifier 24. A motor speed signal is applied over line 25 to regulate the speed at which motor 23 operates.

Reference is now made to FIGS. 2 and 3 which show the motor 23 and clamping arrangement 16. Motor 23 turns a threaded shaft 26 which is threadably received in a wedge-shaped clamping member 16 which moves linearly in a guide 27. Motor 23 and guide 27 are mounted to a platform 28 which is supported in a housing for the unit described. The front wall of the housing is indicated by the reference numeral 29. Guide member 27 has a slot 27a defined therein. Extending through slot 27a and carried by clamping member 16 is a pin 30 which may actuate either of two limit switches 31 and 32 for purposes hereinafter described.

Tubing 15 is inserted in guide member 27 through a slot 34. The tube 15 is received in a recess defined by a wall member 35 which is adjustably positioned within guide 27 by means of a threaded shaft 36 having a knob portion 37 thereon. To insert tube 15, knob 37 is turned to back off member 35 and allow admission of the tube 15 into guide member 27. Then, knob 37 is turned in the opposite direction to move member 35 in to provide a reaction wall against which clamping member 16 may act on tube 15. Member 35 is provided with a plurality of guide leg members 38 which act to define a passage and center tube 15 within guide 27. As shown in FIGS. 2 and 3, motor 23 has driven clamping member or wedge 16 so as to essentially fully constrict tube 15. At this time, pin 30 has engaged limit switch 31.

The network of FIG. 2 is shown schematically in FIG. 5. As shown in FIG. 5, limit switch 31 is closed. Limit switch 32 has two contacts 32a and 32b. Limit switch 31 opens when motor 23 has driven clamp 16 to the position shown in FIGS. 2 and 3. Limit switch 32 will close on contact 32a when clamping member 16 has backed off so that pin 30 actuates switch 32.

Motor 23 operates in a first direction of rotation when a current path is established from line 40 through transistor 41, switch 31 and line 42 to ground through motor 23, and operates in a second direction of operation when a circuit path is established from ground through motor 23, transistor 43 and switch contact 32a over line 44 to a negative terminal N of power supply 19. The potential of terminal N is the same absolute value as the positive potential B applied to line 40. Wen switch 33 is closed and if motor 23 should fully open clamp 16 such that switch contact 32a is closed, a circuit is closed from ground over line 44 to the negative terminal power supply 19 and both audio 45 and visual 45a alarms are given. In some cases, it may be desired to utilize a patient's call button to warn the nurse on duty. A relay 49a may be provided which is energized when switch contact 32a is closed. If this occurs contact 49a is closed to enable a remote alarm 49b at the nurse's duty station or elsewhere.

The conductive state of transistor 46 determines which of the above-described circuit paths are utilized and, hence, the direction of rotation of motor 23. When transistor 46 is conductive, the potential at the collector thereof is determined by the value of resistor 47 which also determines the potential at the base of transistors 41 and 43. Under these circumstances, transistor 41 is turned on, and transistor 43 is biased off. Conversely, when transistor 46 is nonconductive the potential at the collector thereof is negative by virtue of its connection over lines 44 and 48, transistor 43 is turned on and transistor 41 is turned off. The foregoing assumes, for exemplary purposes, that transistor 46 is either ON or OFF, however.

The state of conductivity of transistor 46 is determined by transistor 50 and 51 which sense any unbalance in balance circuit 21. Balance circuit 21 may be considered to be in the form of a bridge having resistances 53 and 54 in two adjacent arms and amplifying elements in the form of transistors 55 and 56, preferably of the field effect type (FET), in the other two adjacent arms. The source electrodes of transistors 55 and 56 are connected to opposite ends of a balance potentiometer 57, and the slider of potentiometer 57 is connected to ground through a resistance 58. The gate electrode of FET 56 is grounded, and the gate electrode of FET 55 is arranged to receive input signals.

The bridge is initially balanced so that with no input to transistor 55, the potential at point 60 is zero and motor 23 does not operate.

A positive, regulated, drop rate reference voltage B is applied across rate potentiometer 22'. A reference current is derived through resistance 62 and applied to terminal 63, which may also be considered a current node. This reference current will charge capacitor 64 toward the voltage at terminal 63. The reference current flows in a positive sense to node 63 and the gate of FET 55. This renders FET 55 more conductive, and the potential at the base of transistor 50 decreases. This, in turn, increases the collector voltage of transistor 50, and the potential at the base of transistor 46. As the conductivity of transistor 46 decreases, the potential at the base of transistor 43 moves in a negative direction and transistor 43 commences to conduct. Motor 23 then responds by retracting clamp 16 at a rate proportional to the reference current.

As clamp 16 retracts, fluid passes through tube 15, the pressure in chamber 13 is reduced and a fluid drop falls from bottle 10 through chamber 13. This is detected by the photosensitive element 18 which triggers one-shot multivibrator 20 to produce a pulse P. Pulse P is applied to a circuit 65 known as a charge pump which comprises capacitor 66 and unidirectional conducting devices such as diodes 67 and 68. Pulse P is passed by capacitor 66 and diode 68. The resulting waveform P' determined by capacitors 64 and 66 is applied to terminal 63. The pulse P' is negative going. This draws current from node 63. This produces a net reduction in the current to transistor 55 and transistors 55 has a bias placed thereon corresponding in time to waveform P'. This results in a corresponding change in the conduction of transistor 55 and an increase in the voltage thereacross. This renders transistor 50 less conductive in the inverted sense which back-biases transistor 46, which in turn establishes a circuit path to ground through transistor 41, line 42 and motor 23. Motor 23 responds to a fluid drop by a step change in its speed in a direction to cause clamp 16 to constrict tube 15.

The reference current continues to charge capacitor 64 in a positive direction, and the motor retracts clamp 16 at a rate proportional to the reference current in a direction to open tube 15. When the step changes in the speed of the motor occur at a rate which just counteracts the constant speed effect of the reference current, the system is balanced and the clamp oscillates back and forth against the tube with resulting zero net motion of the clamp. This oscillating motion significantly improves the control at low drop rates by averaging out the strong nonlinear and discontinuous behavior of the tube caused by the interior wall sticking to itself and by the tendency of the tube to retain its deformed shape.

It may be seen that the frequency at which the tube is opened is a function of the speed of motor 23 which, in turn, is a function of the setting of rate potentiometer 22'.

The speed of motor 23 is regulated through negative feedback to provide a closed loop. When motor 23 operates to open tube 15, the armature voltage at point 60, which is a function of motor speed, is picked off at capacitor 70 and applied over line 25 through a resistance 71 to node 63. This produces a drain on the reference current and regulates the speed of motor 23 so that it is proportional to the reference current. In the opposite direction of rotation of motor 23, when a pulse P' occurs the armature voltage suddenly moves in a direction of opposite polarity. Current now flows back over line 25 through resistance 71 toward node 63 to cause a step change in the opposite direction of the speed of motor 23 as it operates in a direction to close tube 15.

The invention further comprises safety features to sense when the supply of fluid in bottle 10 is exhausted, or if the tube is restricted. When the supply of fluid is exhausted, there will be no more drops detected in drop chamber 13, and the reference voltage will act to move clamping member 16 to the full out position and actuate switch 32. When this occurs, contact 32a closes connecting the alarms 45 and 45a from ground to negative voltage terminal N to both visually and audibly alert an attendant. At the same time, contact 32a opens, deenergizing motor 23.

In the event that for any reason a constriction develops in the tube which establishes a back pressure which prevents the fluid from dripping from bottle 10 into chamber 13, no drops are detected or pulses produced by OSM 20. The reference voltage then drives the clamping member to the full open position, at which time the same warning signals are produced. If for any reason the mechanical flow-restricting clamp is disconnected and clamp 16 opens beyond a predetermined point or if the tube is cut between the drop chamber and clamp 16, or tube 15 should become disconnected from the drop chamber, then the liquid in the drop chamber will no longer appear as a series of discrete drops but will stream from bottle 10. If this should occur then the photoelectric detector no longer sees discrete drops and the detector does not discriminate between this condition and the condition where there are no drops falling. Therefore, the regulator will operate to drive the wedge 16 to the full open position, close switch on contact 32a and sound the appropriate alarm.

By the construction and arrangement of the circuit, the member is always operated to prevent restriction of tube 15 and allows the application of fluid to the patient. However, upon any malfunction or exhaustion of fluid or restriction of the tube, suitable warning signals are given.

In some cases it will be desired to only utilize a given volume of fluid in bottle 10, and means may be provided to cause the flow regulator to stop the flow of fluid after a predetermined time. This may be accomplished by the provision of a timer 72 adapted to close switch 73 and connect the base of transistors 41 and 43 directly to the positive supply voltage. In this case transistor 41 is turned on and transistor 43 is biased off. Motor 23 will then operate to drive wedge 16 to constrict tube 15 and prevent further application of fluid to the patient. When the tube is fully constricted switch 31 is opened and operation of motor 23 is interrupted. While a timer has been exemplified to control the volume of fluid applied to a patient at a given drop rate other means may be utilized. For example, a liquid level detector may be mounted to the bottle 10 and arranged to actuate switch 73 when the volume of liquid in the bottle falls to a predetermined level. Alternatively, the reference voltage picked off potentiometer 22' could be forced to go to zero after a predetermined time of operation.

The arrangement disclosed provides a very linear response of actual drops per minute in relation to a dial setting as exemplified by the setting of potentiometer 22'. Inasmuch as the charge pump 65 always sees a constant load, that is, it is always looking at ground potential through unidirectional conducting device 67, no loading is produced which would introduce nonlinearities into the system and the attendants can always be assured that the actual fluid flow to the patient is accurate with respect to the selected rate as determined by potentiometer 22'.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. A fluid flow regulator for use in combination with a fluid source, a drop chamber coupled to said source, and an output tube coupled to said chamber; clamping means for restricting and opening said tube, a motor for driving said clamping means between restricting and opening positions, means providing a reference voltage source, circuit means responsive to said reference voltage for operating said motor at a speed proportional to the magnitude of the reference voltage to open said clamping means, said circuit means normally continuously operating said motor to open or close said clamping means, means for generating a signal indicative of a drop from the source to the chamber, and means responsive to said indicative signal for actuating said circuit means to operate said motor in a direction to cause said clamping means to restrict the tube.

2. The regulator of claim 1 further including means responsive to said clamping means reaching a predetermined opening position for disabling said motor.

3. The regulator of claim 1, further including alarm means and means responsive to said clamping means reaching a predetermined opening position for actuating said alarm means.

4. The regulator of claim 1 further including means for causing said clamping means to constrict said tube when a predetermined amount of fluid has been exhausted from said source.

5. A fluid drop regulator for use in combination with a fluid source, a drop chamber coupled to the source, and an output tube coupled to said chamber; clamping means for restricting and opening said tube, a motor for driving said clamping means between restricting and opening positions, amplifying means for operating said motor in two directions of operation, a balance circuit, means for applying a drop rate reference signal to said balance circuit to produce unbalance thereof in one direction, said amplifying means being effective to operate said motor at a speed proportional to the magnitude of said reference voltage, said circuit means normally continuously operating said motor to open or close said clamping means, and means for applying a signal indicative of a drop from the source to the chamber to said balance circuit to produce unbalance thereof in the other direction, said amplifying means being responsive to the direction of unbalance to operate said motor in a direction determined by the direction of unbalance of said balance circuit.

6. The regulator of claim 5 wherein said reference signal operates said motor to retract said clamping means.

7. The regulator of claim 5 further including means responsive to said clamping means reaching a predetermined position for actuating an alarm.

8. The regulator of claim 5 further including means for causing said clamping means to constrict said tube when a predetermined amount of fluid has been exhausted from said source.